United States Patent Office 3,705,116
Patented Dec. 5, 1972

---

3,705,116
PROCESS FOR THE MANUFACTURE OF LIGHT BUILDING ELEMENTS
Silvio Vargiu and Mario Pitzalis, Milan, and Pierluigi Abruzzi, Bergamo, Italy, assignors to Società Italiana Resine S.p.A., Milan, Italy
No Drawing. Filed Dec. 10, 1970, Ser. No. 97,025
Claims priority, application Italy, Dec. 23, 1969, 26,204/69
Int. Cl. C08f 47/08
U.S. Cl. 260—2.5 B                16 Claims

ABSTRACT OF THE DISCLOSURE

Lightweight concrete building elements are made by a process in which the polystyrene granules used are associated with a binder containing both a polyepoxy compound and a monoepoxy compound.

---

The present invention relates to improvements in methods of manufacturing light building elements, more precisely relating to building artifacts comprising a hydraulic binder and expanded plastics material. The prior art includes various types of light building materials normally described as "light concretes," such as for example those which have their own porosity (foam structure) and those which are obtained by incorporating light substances. Of these latter, particular interest has been given to the manufactured materials having a density equal to or less than approx. 0.8 kg./cu. dm., which comprise a hydraulic binder and expanded polystyrene.

These products, which find application in the field of lightweight prefabrication, are used by causing homogeneous mixtures of cement, water and expanded polystyrene in granular form to set in appropriate moulds.

It is well known that various advantages are obtained in the manufacture of such "light concretes" by using adhesive substances. More particularly, the particles of expanded polystyrene are treated by an aqueous dispersion of the adhesive prior to mixture with the hydraulic binder.

In this way, advantages are obtained both for the easy homogenisation of the mixtures which are submitted to hardening and for the improved characteristics of the manufactured items obtained from such mixtures.

It is possible to use as glues polyvinyl compounds, although the preferred glues are compounds of condensation between epichlorohydrin and polyhydric alcohols or polyhydroxy phenols known in the art as polyepoxides.

The manufactured building materials which are thus obtained do not however have completely satisfactory characteristics. In particular, the mechanical properties of such manufactured materials are often sufficiently high as to make them useful for all the purposes to which they are usually allocated.

It has now been found possible substantially to improve the mechanical properties of manufactured building materials comprising a hydraulic binder and expanded polystyrene when the granular polystyrene is treated with particular liquid organic hydrocarbons as well as with adhesive, before homogenisation with the hydraulic binder.

The method according to the present invention is therefore essentially based on the treatment of the expanded polystyrene particles by means of aqueous dispersion comprising a polyepoxide and a monoepoxide, this latter being chosen from among the compounds known as alkyl glycidyl ethers and aryl glycidyl ethers.

The particles of polystyrene thus treated are then homogenised with hydraulic binder and the mixture subjected to hardening.

In this way, manufactured materials are obtained which have high mechanical properties, useful in lightweight prefabrication building.

These manufactured materials also have optimum properties for heat and sound insulation, reduced moisture absorption, and easy working properties by using machines normally employed in building.

Thus, according to the process of the present invention, homogenous mixtures comprising expanded polystyrene and a hydraulic binder are subjected to setting in the manufacture of materials for building, with densities of 0.2 to 0.8 kg./cu. dm. In particular, polystyrene in granule form is used, the granules being of diameters up to 3 mm., closed cell, with an apparent density in the mass of approx. 16 to 28 kg./cu. m.

This polystyrene is treated, before being mixed with the hydraulic binder, with a dispersion of a mixture of epoxy glues in water.

More precisely according to the process of the present invention, the glues used are mixtures of polyepoxides, defined as the products of condensation between epichlorohydrin and polyhydric alcohols or polyhydroxy phenols, and alkyl glycidyl ethers or aryl glycidyl ethers, such substances constituting the products of condensation of epichlorohydrin with monohydric aliphatic alcohols or respectively monovalent phenols.

For the purposes of the present invention, the polyepoxides preferred are the liquid products obtained from condensation of epichlorohydrin with diphenol having a relatively low epoxy equivalent of 180 to 220 and a viscosity of 6000 to 23,000 c.p.s.

The alkyl glycidyl ethers which are preferred in the purpose of the present invention are those monoepoxy products which are obtained from condensation of epichlorohydrin with monohydric aliphatic alcohols having from 3 to 12 carbon atoms in the molecule. Of the alkyl glycidyl ethers, butyl glycidyl ether is preferred.

In the achievement of the object of the present invention, the particles of expanded polystyrene are treated by means of aqueous dispersions comprising epoxy compounds in which the weight ratio of the polyepoxy compound to the monoepoxy compound is maintained at between 0.3:1 and 1:1.

In fact, only with the glue compositions comprised within this range of values is it possible to obtain those improvements in the mechanical properties of the manufactured building materials to which mention has been previously made.

According to the process of the present invention, the dispersions of glue also contain one or more hardeners for the epoxy compounds.

Such hardeners are selected from those normally known in the art such as for example: methylenediamine, triethylene tetramine, and adducts based on phenyl glycidyl ether and tetraethylene pentamine, and are used in quantities of 10 to 30 parts by weight per 100 parts by weight of epoxy compounds.

The dispersion of the glue in the aqueous phase is obtained by means of substances of the surface active type, such as for example aryl sulphonates, alkyl aryl sulphonates, the products of condensation of ethylene oxide with phenols or alkyl phenols and the sulphonated alcohols such as sodium lauryl sulphonate.

It has been found that the best results are obtained by homogenising epoxy compounds containing the hardener with the surface active agent or preferably with a mixture of surface active agents, in a little water, after which a further quantity of water can be added to the resultant mixture which is maintained under brisk agitation. In this way, aqueous dispersions are obtained which remain stable for several hours, useful in the treatment of expanded polystyrene particles.

Thus, in a preferred embodiment, an aqueous dispersion containing from 5 to 15% by weight of a mixture of surface active media is prepared, comprising sulphonated alcohols and compounds of addition of ethylene oxide and alkyl phenols.

Then, from 0.05 to 0.2 part by weight of such dispersion to each part by weight of glue containing hardener, will be homogenised.

To the resultant mixture must then be added water, under brisk agitation, up to a concentration of glue in the dispersion of 5 to 20% by weight.

The particles of expanded polystyrene are then treated by means of such dispersions so as to utilise a quantity of adhesive epoxy compounds from 1 to 8 kg. to every cu.m. of expanded polystyrene.

The particles which are thus coated are then mixed with the hydraulic binder and with the water, homogenised, and the homogeneous mixture is allowed to harden.

In particular, the binders used may be normal cements of the type commercially known as 325, high-strength cements (type 425), high-strength and rapid hardening cements (type 525), aluminous cement (type 525), cements for retaining dams (type 225).

The proportion by weight between the cement and the polystyrene depends on the density of the manufactured material which it is intended to obtain, taking into account the bulk density of the polystyrene used.

To the mixture which is subjected to hardening, it is possible also to add inert substances such as for example sand, although the use of such substances is not proposed in the preferred embodiment. Finally, the quantity of water present in the mixture which is subjected to hardening will vary according to the quantity of cement used, generally the best result being obtained with proportions by weight of water:cement of 0.4:1 to 0.5:1.

The mixtures of the present invention may be hardened at ambient or at higher temperatures: in the manufacture of materials for building, such mixtures may be poured into appropriate moulds or may be extruded in machines suitable for the purpose.

The following experimental examples relate to the preparation and setting of homogeneous mixtures comprising: cement, water and expanded polystyrene.

Particularly listed are examples in which the particles of polystyrene are treated with aqueous dispersions of polyepoxy compounds according to the prior art, and by means of aqueous dispersions comprising polyepoxy compounds and monoepoxy compounds according to the process of the present invention.

In every case, the hydraulic binder used was type 325 Portland Cement.

In the preparation of the homogeneous mixtures, the cement, water and polystyrene treated with the aqueous dispersions of glue, were poured into polyethylene vessels and the mixture reblended for 5 minutes using a wooden spatula.

Samples were then prepared by pouring the homogenised mixture into moulds by means of a steel ladle.

The moulds used were made of wood which had been varnished to prevent water being absorbed into the mixture. The samples were kept in the moulds for 24 hours under ambient conditions and then carefully extracted.

In particular, cylindrical samples were prepared with a height of 50 mm. and a diameter of 50 mm. for the compression strength tests.

In order to determine tensile strength, samples were prepared in a butterfly shape with a central portion to the following dimensions: height 22 mm. and width 22 mm. After the samples had been taken from the moulds, they were conditioned under three different ambients:

at ambient temperature and humidity;
at ambient temperature and humidity with a daily 60-second bath in water at 20° C.;
immersed in water at 20° C.

The tensile and compression strength tests were performed on samples after 2, 7 and 28 days of treatment under the various conditions described.

In particular, the compression strength was tested on cylindrical samples with a velocity of 5 mm./min., the tensile strength being tested on butterfly-shaped samples at a velocity of 10 mm./min.

EXAMPLE 1

(Examples 1 to 3 are comparative only)

An aqueous suspension of surface active agents is prepared, consisting of: water 91.68, the compound addition of 1 mol of nonyl phenol with 30 mols ethylene oxide 5.20, sodium lauryl sulphonate 1.48, and the compound of addition of 1 mol nonyl phenol with 6 mols ethylene oxide 1.64 parts by weight.

A homogeneous mixture is then prepared by the addition of 0.1 parts by weight of the dispersion of surface active agents to every part by weight of a polyepoxy compound containing the hardener. In particular, the epoxy compound used was a product of condensation of epichlorohydrin with diphenol to the following characteristics: epoxy equivalent 180–210 viscosity 9000 to 13,000 c.p.s.

Triethylene tetramine was used as a hardener, in quantities equal to 11 parts by weight for every 100 parts by weight of polyepoxide.

An aqueous dispersion of the glue was then prepared by the addition, under brisk agitation, of water in a quantity equal to 75 parts by weight for evry part by weight of homogeneous mixture of the glue the preparation of which has been described already.

In this test, expanded polystyrene was used in the form of beads with a diameter of 1 to 2.5 mm. and an apparent density in bulk of 16 kg./cu.m.

The said polystyrene is treated by the aqueous solution of glue, and in particular 1.94 parts by weight of dispersion are used for every part by weight of polystyrene. The mixture formed of: cement 560, water 192.5, expanded polystyrene and glue dispersion 51.5 parts by weight is then homogenised.

This homogenous mixture is poured into the moulds and finally the characteristic features of the hardened products are recorded, their density being equal to approx. 0.8 kg./cu.m., from what is described herein.

The results are summarised in Table 1.

TABLE 1

| | A | B | C |
|---|---|---|---|
| Compression strength, kg./sq. cm.: | | | |
| After 2 days | 9.5 | 9.0 | 8.7 |
| After 7 days | 10.0 | 10.0 | 9.0 |
| After 28 days | 11.0 | 11.3 | 9.5 |
| Tensile strength, kg./sq. cm.: | | | |
| After 2 days | 1.9 | 1.8 | 1.8 |
| After 7 days | 2.2 | 2.4 | 2.7 |
| After 28 days | 2.5 | 3.2 | 3.1 |

It should be noted that under A in Table 1 are listed the results of findings obtained on samples maintained under ambient conditions, while B shows the results with samples kept under ambient conditions and immersed every day for 60 seconds in water at 20° C. while the figures under C relate to samples kept immersed in water at 20° C.

These denominations will be maintained also in subsequent tables.

EXAMPLE 2

The same procedure was adopted as in Example 1, the hardener being the adduct of phenyl glycidyl ether and tetraethylene pentamine, in a quantity equal to 25 parts per 100 parts by weight of polyepoxy compound.

The results are summarised in Table 2.

TABLE 2

|  | A | B | C |
|---|---|---|---|
| Compression strength, kg./sq. cm.: |  |  |  |
| After 2 days | 8.1 | 6.8 | 9.2 |
| After 7 days | 10.0 | 9.5 | 11.4 |
| After 28 days | 11.7 | 11.4 | 12.5 |
| Tensile strength, kg./sq. cm.: |  |  |  |
| After 2 days | 1.8 | 1.7 | 1.5 |
| After 7 days | 2.3 | 2.1 | 1.9 |
| After 28 days | 2.4 | 3.3 | 3.0 |

EXAMPLE 3

The same procedure is adopted as in Example 1, the hardener used being methylene diamine in a quantity equal to 21 parts by weight per 100 parts by weight of polyepoxy compound.

The results are summarised in Table 3.

TABLE 3

|  | A | B | C |
|---|---|---|---|
| Compression strength, kg./sq. cm.: |  |  |  |
| After 2 days | 8.5 | 8.0 | 8.0 |
| After 7 days | 11.6 | 11.8 | 11.8 |
| After 28 days | 11.8 | 14.2 | 11.8 |
| Tensile strength, kg./sq. cm.: |  |  |  |
| After 2 days | 1.2 | 1.5 | 1.6 |
| After 7 days | 1.4 | 1.9 | 2.0 |
| After 28 days | 1.8 | 4.0 | 2.8 |

EXAMPLE 4

An aqueous dispersion of surface active agents is prepared as described in Example 1. An homogeneous mixture is then prepared by the addition of 0.15 part by weight of such solution to every part by weight of a mixture of epoxy glues and hardener.

In particular, epoxy glues used are the polyepoxide described in the first example and butyl glycidyl ether. A weight proportion of polyepoxide/butyl glycidyl ether equal to 1:1 is maintained in this test.

In addition, the epoxy glue mixture contains as a hardener the adduct of phenyl glycidyl ether and tetraethylene pentamine in quantities equal to 25 parts by weight to every 100 parts by weight of epoxy compounds.

The aqueous dispersion is then prepared by adding under brisk agitation, 7.5 parts by weight to every part by weight of the homogeneous mixture prepared as described. In this test, expanded polystyrene of the type described in the previous example is used.

This polystyrene is treated with the aqueous dispersion of the glue mixture and in particular 1.94 parts by weight of the dispersion to every part by weight of polystyrene.

The mixture consisting of cement 560, water 192.5, polystyrene and aqueous dispersion of glue 51.5 parts by weight is then homogenised. This homogeneous mixture is poured into moulds and finally the properties of the hardened products are recorded, their density being equal to approx. 0.8 kg./cu.dm., as described in the text of the patent.

The results are summarised in Table 4.

TABLE 4

|  | A | B | C |
|---|---|---|---|
| Compression strength, kg./sq. cm.: |  |  |  |
| After 2 days | 11.5 | 11.5 | 11.0 |
| After 7 days | 13.0 | 13.0 | 12.5 |
| After 28 days | 13.5 | 14.0 | 14.0 |
| Tensile strength, kg./sq. cm.: |  |  |  |
| After 2 days | 3.3 | 4.0 | 3.3 |
| After 7 days | 3.8 | 4.3 | 4.3 |
| After 28 days | 3.8 | 4.5 | 4.3 |

EXAMPLE 5

The same procedure is carried out as in Example 4, using as a glue mixture the polyepoxy compound and methyl glycidyl ether in proportions of 0.66:1 by weight.

The results are summarised in Table 5.

TABLE 5

|  | A | B | C |
|---|---|---|---|
| Compression strength, kg./sq. cm.: |  |  |  |
| After 2 days | 13.0 | 12.5 | 12.5 |
| After 7 days | 15.0 | 15.5 | 15.5 |
| After 28 days | 15.0 | 16.5 | 16.5 |
| Tensile strength, kg./sq. cm.: |  |  |  |
| After 2 days | 3.5 | 4.0 | 3.8 |
| After 7 days | 4.5 | 5.0 | 4.8 |
| After 28 days | 4.5 | 5.0 | 4.8 |

EXAMPLE 6

Proceed as in Example 4, using as a glue mixture the polyepoxy compound and butyl glycidyl ether in proportions of 0.43:1 by weight.

The results are summarised in Table 6.

TABLE 6

|  | A | B | C |
|---|---|---|---|
| Compression strength, kg./sq. cm.: |  |  |  |
| After 2 days | 12.5 | 12.5 | 12.5 |
| After 7 days | 14.0 | 14.2 | 13.5 |
| After 28 days | 15.0 | 15.5 | 15.0 |
| Tensile strength, kg./sq. cm.: |  |  |  |
| After 2 days | 3.5 | 3.8 | 3.6 |
| After 7 days | 4.0 | 4.8 | 4.6 |
| After 28 days | 4.0 | 4.8 | 4.6 |

EXAMPLE 7

The same procedure is adopted as in Example 4, using as a glue mixture the polyepoxy compound and butyl glycidyl ether in proportions of 2.33:1 by weight.

The results are summarized in Table 7.

TABLE 7

|  | A | B | C |
|---|---|---|---|
| Compression strength, kg./sq. cm.: |  |  |  |
| After 2 days | 2.5 | 2.5 | 2.3 |
| After 7 days | 2.9 | 3.7 | 3.5 |
| After 28 days | 3.0 | 3.7 | 3.5 |
| Tensile strength, kg./sq. cm.: |  |  |  |
| After 2 days | 2.5 | 2.5 | 2.3 |
| After 7 days | 2.9 | 3.7 | 3.5 |
| After 28 days | 3.0 | 3.7 | 3.5 |

We claim:

1. A process for the manufacture of light building elements having a density of 0.2 to 0.8 kg./cu. dm., by the hardening of mixtures comprising hydraulic cement, water and a homogeneous mixture of granular expanded polystyrene in an aqueous dispersion consisting essentially of an epoxy binder, said particles of expanded polystyrene, having a bulk density of 16 to 28 kg./cu. dm., and being admixed with said epoxy binder before being blended with said hydraulic cement and said water, said epoxy binder consisting essentially of a polyepoxide compound and a monoepoxide compound selected from the group consisting of alkyl glycidyl ethers and aryl glycidyl ethers, the proportions by weight between said polyepoxy compound and said monoepoxy compound being between 0.3:1 and 1:1.

2. A process according to claim 1, characterised in that the polyepoxy compounds are the liquid products of condensation of epichlorohydrin with diphenol, with an epoxy equivalent of 180 to 220 and a viscosity of 6,000 to 23,000 c.p.s.

3. A process according to claim 1, characterised in that the monoepoxy compound is butyl glycidyl ether.

4. A process according to claim 1, characterised in that a quantity of epoxy compound of 1 to 8 kg. per cu. m. of granular expanded polystyrene is used.

5. A process according to claim 1, characterised in that, in the aqueous dispersions, 10 to 30% by weight of hardener is used in the epoxy compounds.

6. A process according to claim 1, characterised in that the hardener is selected from methylene diamine, tetraethylene pentamine and phenyl glycidyl ether and tetraethylene pentamine adducts.

7. A process according to claim 1, wherein said aqueous dispersion consisting essentially of an epoxy compound further includes a surface active agent.

8. A process according to claim 7, wherein said surface active agent is selected from the group consisting essentially of sulphonated alcohols and the products of addition of ethylene oxide and alkyl phenols.

9. A process according to claim 1, characterised in that in the preparation of the mixtures which are subjected to hardening, proportions by weight of water to cement of 0.1:1 to 0.5:1 are maintained.

10. A process according to claim 1, wherein the glycidyl ether is an alkyl glycidyl ether.

11. A process according to claim 10 wherein said alkyl glycidyl ether is the product obtained from the condensation of epichlorohydrin with monohydric aliphatic alcohols having from 3 to 12 carbon atoms.

12. The process according to claim 7 wherein said surface active agents are 0.05 to 0.2% by weight of the aqueous dispersion.

13. The process according to claim 1, wherein the weight ratio of water to cement is in the range of 0.4–0.5 to 1.

14. A light building element having a density of 0.2 to 0.8 kg./cu. dm. consisting essentially of hydraulic cement, water, and a homogeneous mixture of granular expanded polystyrene and an epoxy binder, said granular expanded polystyrene having a bulk density of 16 to 28 kg./cu. m. and having been admixed with said epoxy binder before being blended with said cement and said water, said epoxy binder consisting essentially of a polyepoxide compound and a monoepoxide compound, said monoepoxide compound being selected from the group consisting of alkyl glycidyl ethers and aryl glycidyl ethers, the proportion by weight of said polyepoxide compound to said monoepoxide compound being in the range of 0.3–1 to 1.

15. The process according to claim 11 wherein said monoepoxide compound is the condensation product of epichlorohydrin with a member selected from the group consisting of polyhydric alcohols and polyhydroxyphenols.

16. In a process for the manufacture of light building elements having a density of 0.2 to 0.8 kg./cu. dm., by the hardening of mixtures comprising cement, water and polystyrene having a bulk density of 16 to 28 kg./cu. m., the improvement which comprises admixing said particles of expanded polystyrene before being blended with cement and water, with an aqueous dispersion consisting essentially of a polyepoxide compound and a monoepoxide compound whereby a homogeneous mixture is obtained, said monoepoxide compound being selected from the group consisting of alkyl glycidyl ethers and aryl glycidyl ethers, the proportions by weight between said polyepoxy compound and said monoepoxy compound being between 0.3:1 and 1:1.

References Cited
UNITED STATES PATENTS

| | | | |
|---|---|---|---|
| 3,198,758 | 8/1965 | Donnelly | 260—2.5 EP |
| 3,272,765 | 9/1966 | Sefton | 260—2.5 B |
| 3,251,916 | 5/1966 | Newnham et al. | 260—2.5 B |
| 2,806,509 | 9/1957 | Bozzacco et al. | 260—2.5 B |
| 2,958,905 | 11/1960 | Newberg et al. | 260—2.5 B |
| 2,959,508 | 11/1960 | Graham et al. | 260—2.5 B |

MURRAY TILLMAN, Primary Examiner

M. FOELAK, Assistant Examiner

U.S. Cl. X.R.

260—2.5 EP, 29.2 EP, 29.6 S, 29.6 AB, 830 TW, 837 R